US006070810A

United States Patent [19]

Chen

[11] Patent Number: 6,070,810

[45] Date of Patent: Jun. 6, 2000

[54] BI-DIRECTIONAL COMPRESSED AIR OUTLET

[76] Inventor: Kuo-Liang Chen, No. 246-1, Changma Rd., Changhua City, Taiwan

[21] Appl. No.: 09/210,409

[22] Filed: Dec. 11, 1998

[30] Foreign Application Priority Data

Jan. 23, 1998 [TW] Taiwan ................................ 87201256

[51] Int. Cl.[7] ...................................................... F16K 11/07

[52] U.S. Cl. .......................... 239/447; 239/436; 251/351

[58] Field of Search .................................... 239/436, 438, 239/443, 446, 447, 456; 251/351; 137/625.48

[56] References Cited

U.S. PATENT DOCUMENTS 3,514,042 5/1970 Freed ...................................... 239/438
3,985,156 10/1976 Walker ................................ 137/637.2

*Primary Examiner*—John Fox
*Attorney, Agent, or Firm*—Thomas, Kayden, Horstemeyer & Risley, L.L.P.

[57] ABSTRACT

A bi-directional compressed air outlet includes a tubular body having a handle which has a chamber and a passage defined therein, and a valve device disposed to the handle and communicating between the chamber and the passage. A middle member is movably received in the body and has a plurality of inclined apertures defined therethrough. The body has an annular inclined flange defined in an inner periphery thereof and the middle member has an annular inclined surface defined in a front end thereof so as to mate with the inclined flange. Air in the chamber proceeds through the passage and selectably toward a front end of the body via a space defined between the inclined flange and the inclined surface, or a rear end of the body via the inclined apertures.

8 Claims, 6 Drawing Sheets

BI-DIRECTIONAL COMPRESSED AIR OUTLET

BACKGROUND OF THE INVENTION

1. Field of the Invention

The present invention relates to a compressed air outlet and, more particularly, to an improved compressed air outlet which has two outlets extending in different directions and each outlet being selectable by operating a middle member rotatably received in the device.

2. Brief Description of the Prior Art

FIGS. 4–6 show a conventional bi-directional compressed air outlet which includes a tubular body 40 with a handle 41 connected thereto which is connected to a high pressure air source (not shown) and has an operation valve means 42 disposed thereto. The handle 41 has a chamber 410 defined in a lower portion thereof and a passage 411 defined in an upper portion thereof. The operation valve means 42 is disposed between the chamber 410 and the passage 411. When the operation valve means 42 is pushed, it communicates the passage 411 with the chamber 410. The body 40 has a shoulder portion 44 extending inwardly and radially from an inner periphery thereof so as to form a front passage 45 and a rear passage 43 for the body 40. An inner threaded portion 430 is defined in a rear end defining the rear passage 43. A middle member 50 is received in the rear passage 43 and an end member 60 is disposed to the rear end of the tubular body 40, wherein the end member 60 has an outer threaded portion 62 which is threadedly engaged with the inner threaded portion 430. The end member 60 has a central hole 61 defined therethrough. The middle member 50 has a central passage 500 and communicates with the front passage 45 and the central hole 61. A plurality of inclined slots 520 are defined through a sidewall of the middle member 50 and communicate with the central passage 500. As shown in FIG. 5, the inclined slots 520 are defined inclinedly toward the front end of the body 40 from an outer periphery of the middle member 50, and when the operation valve means 42 is pushed, high pressure air in the chamber 410 flows through the passage 411, the slots 520 and progresses toward the front end of the body 40 via the front passage 45 such that the bi-directional compressed air outlet can be used as a blower. When the air flow is needed to blow toward the rear end of the body 40 or when a suction device is required, referring to FIG. 6, a user (not shown) unthreads the end member 60 from the body 40, pulls the middle member 50 out from the body 40, then reversely inserts the middle member 50 into the body 40 and threadedly disposes the end member 60 to the body 40 again. The inclined slots 520 are defined inclinedly toward the rear end of the body 40 from the outer periphery of the middle member 50 so that air flow progresses through the central hole 61 of the end member 60 when the operation valve means 42 is pushed.

It is inconvenient for the user to change the direction of the air flow because it is necessary to take both the end member 60 and the middle member 50 from the body 40, which takes time. Furthermore, the middle member 50 has two seals 510 mounted thereto so that frequent movement of the middle member 50 could damage the seals 510.

The present invention intends to provide an improved two direction blowing device to mitigate and/or obviate the above-mentioned problems.

SUMMARY OF THE INVENTION

The present invention provides a bi-directional compressed air outlet which includes a tubular body including a front portion in which a front passage is defined and a rear portion in which a rear passage is defined which co-axially communicates with the front passage. An operation slot is defined through a sidewall of the rear portion and communicates with the rear passage. An annular inclined flange extends radially and inwardly from an inner periphery of the body. The rear portion has a handle connected thereto which has a chamber and a passage respectively defined therein, wherein the passage communicates with the rear passage. A valve means is disposed in the handle such that the chamber communicates with the passage when the valve means is operated.

A middle member is movably received in the rear passage and has a central passage defined longitudinally therethrough. A bolt extends through the operation slot and is fixedly connected to the middle member which has a groove defined in an outer periphery thereof. A plurality of apertures is defined inclinedly through a sidewall of the middle member, wherein the apertures communicate with the groove. An annular inclined surface is defined in a front end of the middle member and is detachably mated with the annular inclined flange of the body.

It is an object of the present invention to provide a bi-directional compressed air outlet which is easily operated.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
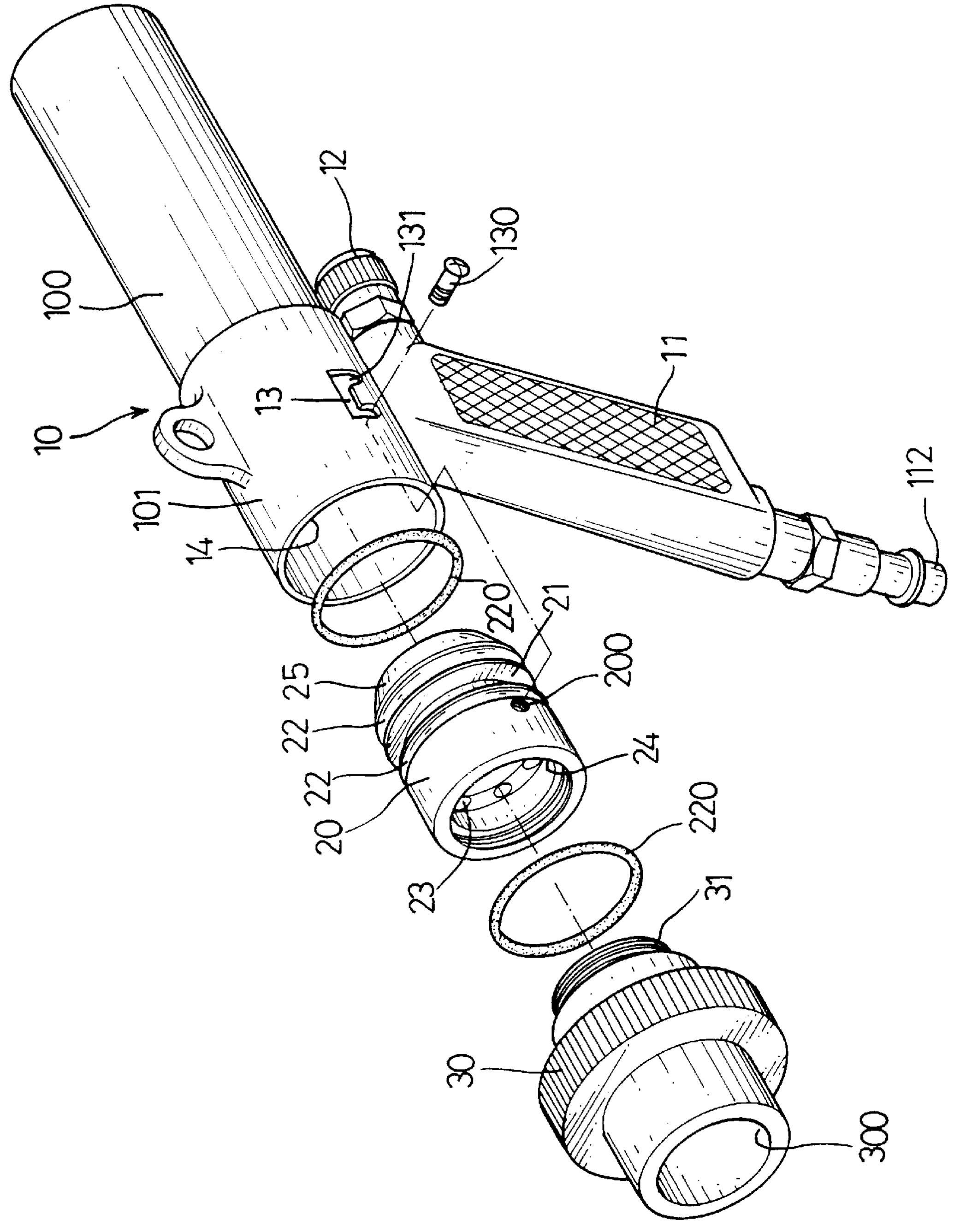
FIG. 1 is an exploded view of a bi-directional compressed air outlet in accordance with the invention.
Figure 2:
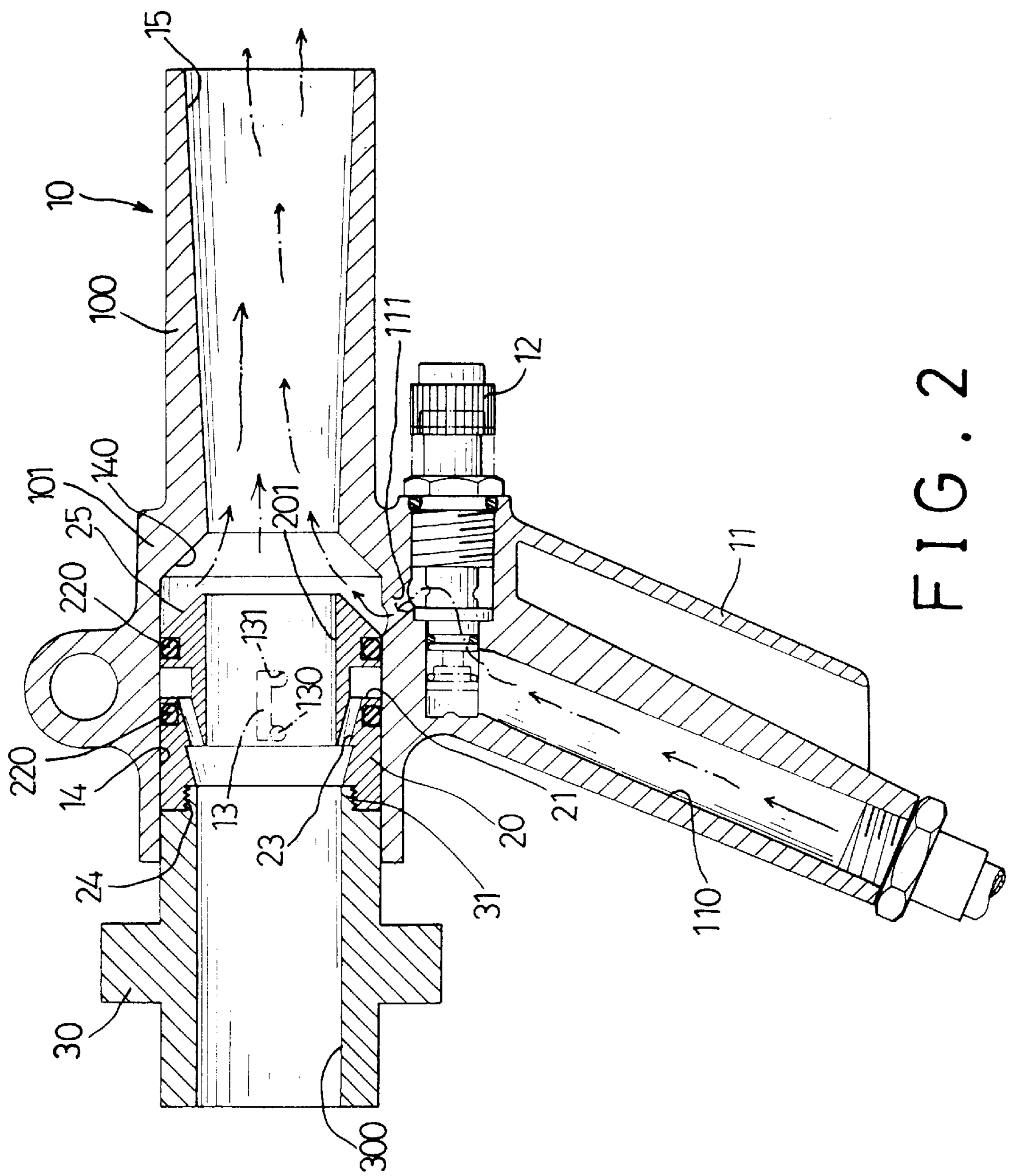
FIG. 2 is a side elevational view, partly in section, of the bi-directional compressed air outlet wherein a middle member is positioned in a first position so that air flows through a front end of the body thereof.

Referring to the drawings and initially to FIGS. 1 and 2, a bi-directional compressed air outlet in accordance with the present invention generally includes a tubular body 10 which includes a front portion 100 in which a front passage 15 is defined and a rear portion 101 in which a rear passage 14 is defined which co-axially communicates with the front passage 15. An operation slot 13 is defined through a sidewall of the rear portion 101 and communicates with the rear passage 14. A periphery defining the operation slot 13 has two recesses 131 respectively defined in two ends thereof. An annular inclined flange 140 extends radially and inwardly from an inner periphery of the body 10. The rear portion 101 has a handle 11 connected thereto which has a chamber 110 defined therein so as to communicate with a high pressure air source (not shown) by a pipe 112. A passage 111 is defined through an upper portion of the handle 11 and communicates with the rear passage 14. A valve means 12 is disposed in the handle 11 such that the chamber 110 communicates with the passage 111 when the valve means 12 is pushed.

A middle member 20 is movably received in the rear passage 14 and has a central passage 201 defined longitudinally therethrough. A threaded hole 200 is defined through a sidewall of the middle member 20 and a bolt 130 extends through the operation slot 13 and is threadedly received in the threaded hole 200. Two annular notches 22 are respectively defined in an outer periphery of the middle member 20 so as to receive a respective on of two seals 220 in each one of the two annular notches 22. The middle member 20 is positioned in a first position (FIG. 2) where the bolt 130 is received in the recess 131 near a rear end of the body 10, and the middle member 20 is positioned in a second position (FIG. 3) where the bolt 130 is received in the other recess 131 near a front end of the body 10. The middle member 20 has a groove 21 defined in the outer periphery thereof and a plurality of apertures 23 defined inclinedly through the sidewall thereof. The inclined apertures 23 communicate with the groove 21. An annular inclined surface 25 is defined in a front end of the middle member 20 and is detachably engaged with the annular inclined flange 140 of the body 10. That is to say, when the middle member 20 is moved to the first position, the annular inclined surface 25 is disengaged from the annular inclined flange 140, and when the middle member 20 is moved to a second position, the annular inclined surface 25 is engaged with the annular inclined flange 140.

The middle member 20 has an end member 30 connected to a rear end thereof and the end member 30 extends from the rear portion 101 of the body 10. The end member 30 has a central hole 300 defined therethrough which communicates with the central passage 201. The middle member 20 has an inner threaded portion 24 defined in a rear end thereof so as to be threadedly engaged with an outer threaded portion 31 of the end member 30 so that when rotating the end member 30, the bolt 130 leaves the one of the two recesses 131 and the middle member 20 can be moved within the rear passage 14.

Figure 3:
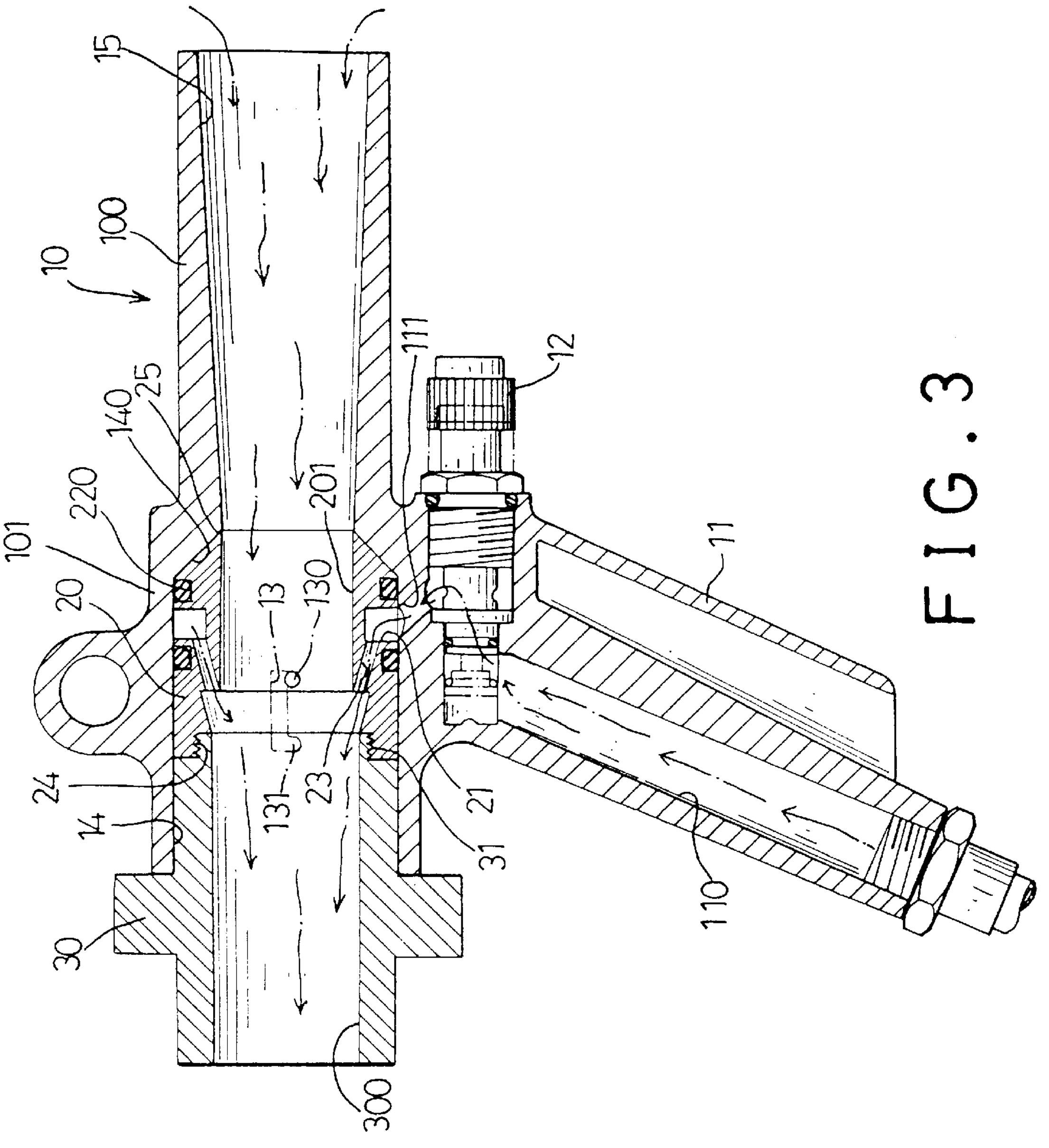
FIG. 3 is a side elevational view, partly in section, of the bi-directional compressed air outlet wherein the middle member is positioned in a second position so that air flows through a rear end of the body thereof.
Figure 4:
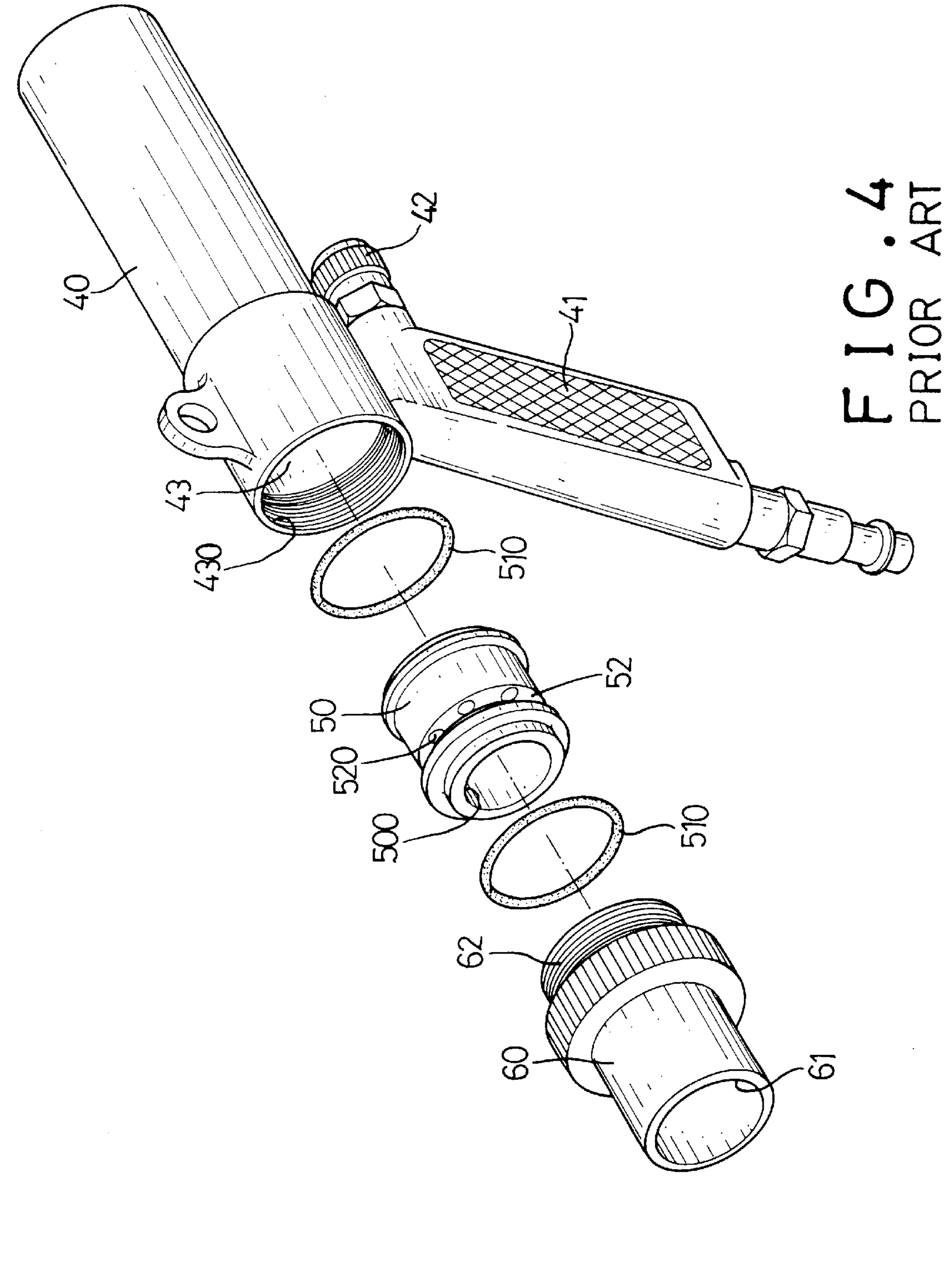
FIG. 4 PRIOR ART
FIG. 4 is an exploded view of a conventional bi-directional compressed air outlet.
Figure 5:
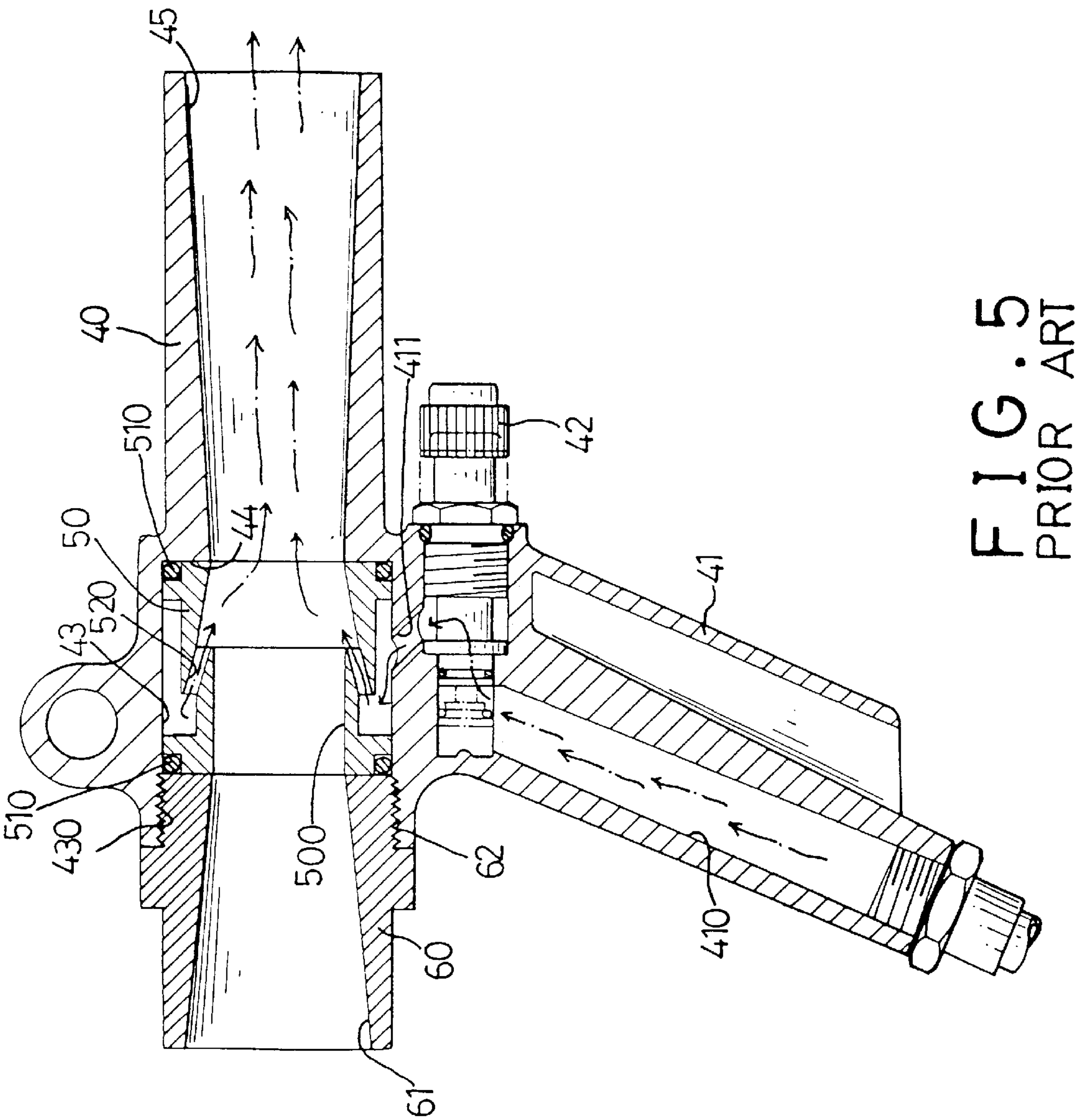
FIG. 5 PRIOR ART
FIG. 5 is a side elevational view, partly in section, of the conventional bi-directional compressed air outlet wherein a middle member is positioned so that air flows through a front end thereof.
Figure 6:
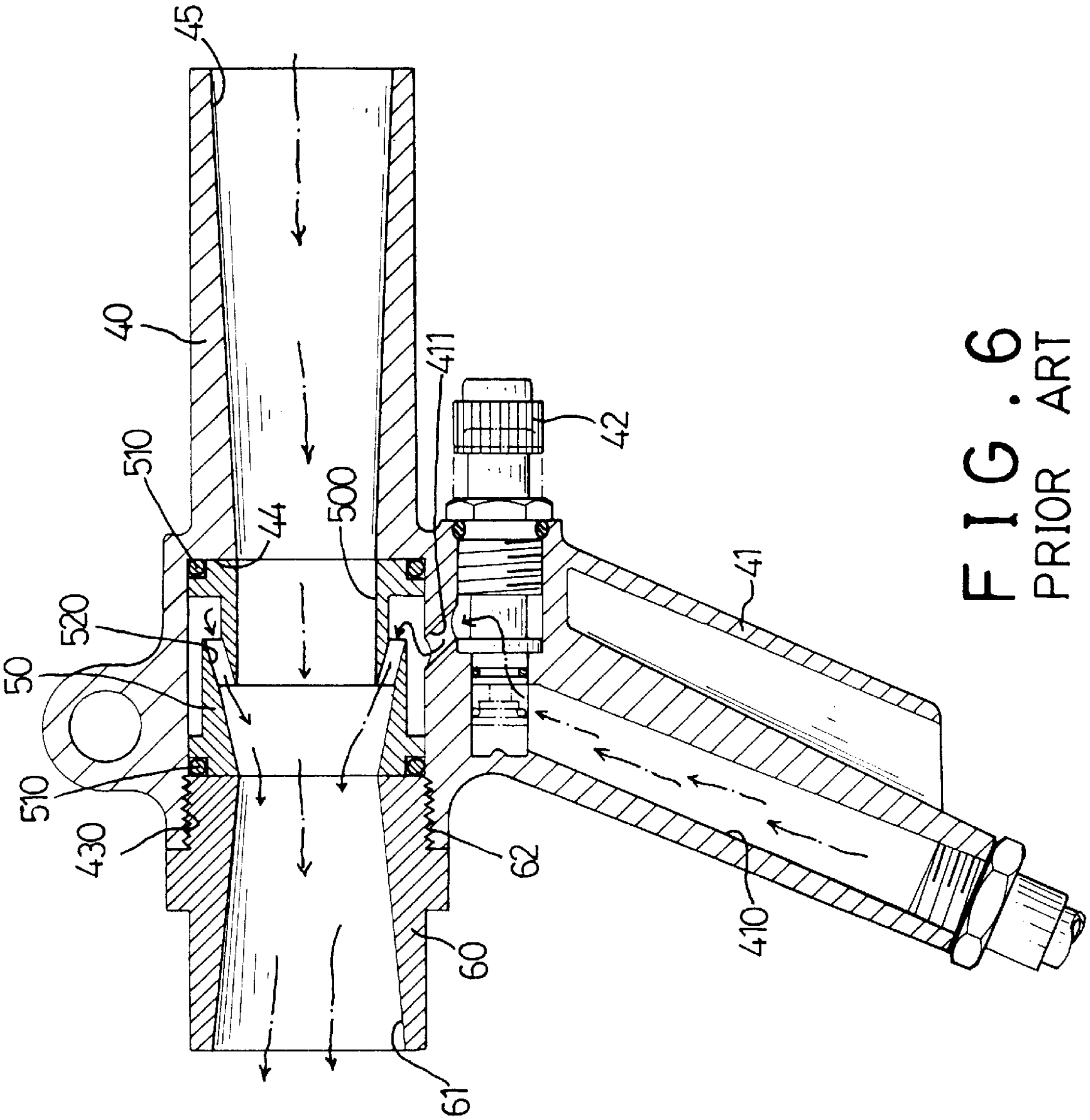
FIG. 6 PRIOR ART
FIG. 6 is a side elevational view, partly in section, of the conventional bi-directional compressed air outlet wherein the middle member is positioned so that air flows through a rear end thereof.

When the middle member 20 is moved to the first position, the passage 111 communicates with a space in the rear passage 14 wherein the space is defined between the annular inclined surface 25 and the annular inclined flange 140 so that air progresses via the front passage 15. When the middle member 20 is moved to the second position, as shown in FIG. 3, the inclined surface 25 is engaged with the inclined surface 25, and the annular groove 21 is moved to communicate with the passage 111 so that air progresses from the central passage 201 and the central hole 300. Also, the second position of the middle member 20 allows the bi-directional compressed air outlet to be used as a suction device.

Although the invention has been explained in relation to its preferred embodiment, it is to be understood that many other possible modifications and variations can be made without departing from the scope of the invention as hereinafter claimed.

What is claimed is:

1. A bi-directional compressed air outlet comprising:

a tubular body including a front portion in which a front passage is defined and a rear portion in which a rear passage is defined which co-axially communicates with said front passage, an annular inclined flange extending radially and inwardly from an inner periphery of said body, said rear portion having a handle connected thereto which has a chamber defined therein and a passage defined therethrough which communicates with said rear passage, a valve means disposed in said handle such that said chamber communicates with said passage when said valve means is operated, and a middle member movably received in said rear passage and having a central passage defined longitudinally therethrough, said middle member having a groove defined in an outer periphery thereof and a plurality of apertures defined inclinedly through a sidewall thereof, said apertures communicating with said groove, an annular inclined surface defined in a front end of said middle member and detachably mated with said annular inclined flange of said body.

2. The bi-directional compressed air outlet as claimed in claim 1 wherein said middle member is moved to a first position where said annular inclined surface is disengaged from said annular inclined flange, and said passage communicates with a space in said rear passage and defined between said annular inclined surface and said annular inclined flange.

3. The bi-directional compressed air outlet as claimed in claim 1 wherein said middle member is moved to a second position where said annular inclined surface is mated with said annular inclined flange, and said passage communicates with said slots of said middle member.

4. The bi-directional compressed air outlet as claimed in claim 1 wherein a periphery defining said operation slot has two recesses respectively defined in two ends thereof.

5. The bi-directional compressed air outlet as claimed in claim 1 wherein said middle member has an end member extending from a rear end thereof and said end member extends from said rear portion of said body.

6. The bi-directional compressed air outlet as claimed in claim 5 wherein said end member has a central hole defined therethrough which communicates with said central passage.

7. The bi-directional compressed air outlet as claimed in claim 1 wherein an operation slot is defined through a sidewall of said rear portion and communicates with said rear passage, a threaded hole defined in said sidewall of said middle member so that a bolt extends through said operation slot and is threadedly received in said threaded hole.

8. The bi-directional compressed air outlet as claimed in claim 1 wherein said middle member has two annular notches respectively defined in said outer periphery thereof so as to respectively receive one of two seals therein.

* * * * *